UNITED STATES PATENT OFFICE.

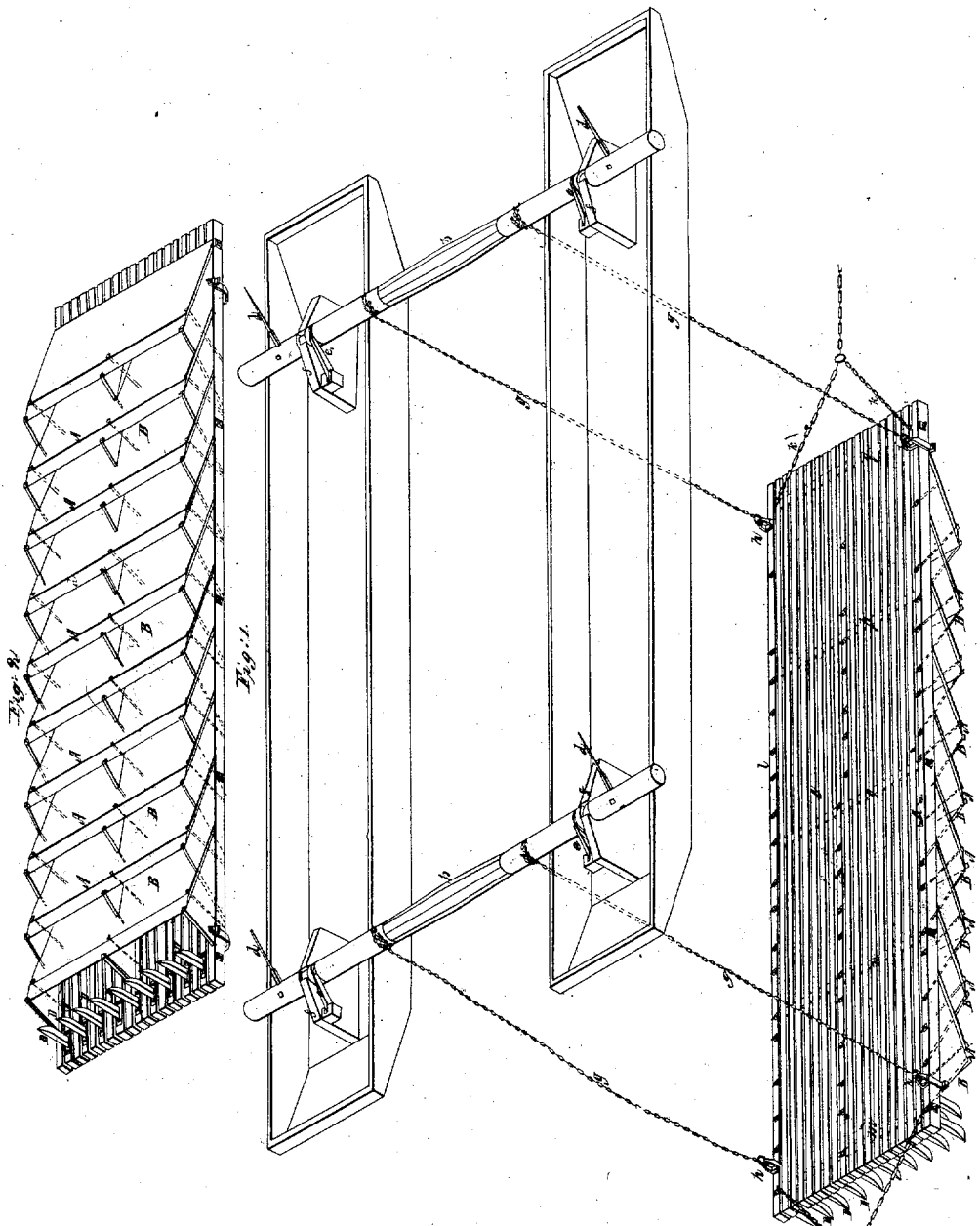

WILLIAM P. BRAYTON AND JAMES HAMILTON, OF NEW YORK, N. Y.

MUD-MACHINE OR SUBMARINE EXCAVATOR FOR MAKING OR CLEARING OUT CHANNELS IN HARBORS, RIVERS, AND STREAMS.

Specification of Letters Patent No. 1,063, dated January 8, 1839.

*To all whom it may concern:*

Be it known that we, WILLIAM P. BRAYTON and JAMES HAMILTON, both of the city of New York, have invented a new and useful improvement in machinery for removing dirt, mud, &c., in docks and slips and making and cleaning out channels in bars of harbors, rivers, and streams and which is applicable to various useful purposes, called a "Submarine excavator."

The following is a description of the construction of the said improvement; reference being had to the drawings hereunto annexed and making part of this specification.

Figure 1 is the machine suspended between two boats for operation; the boats are confined together by two windlasses b, b, one across the bows, the other across the stern of the boats, the boats being placed at sufficient distance from each to allow the machine C to be raised up and let down by the windlasses b, b, between said boats. d, d, d, d, are levers to work the windlass. c, c, are pawls falling into a ratchet to regulate the operation of the machine. f, f, f, f, are fixtures or bearings, attached firmly in the center near the ends of the boats for the journals of the windlasses to work in and rest on. g, g, g, g, are the chains by which the machine is let down and raised up by the windlasses b, b, being attached to the four corners of the machine at h, h, h, h. i, i, are the chains to attach the power by which the machine is put in operation. k k, are the chains to haul the machine backward.

The machine is made as follows; l, l, denote sticks of timber 40 feet long more or less, 8 or 10 inch wide more or less, 4 inch thick more or less. Timbers of this description are set up edgewise, about two inches apart, until they make a width of 12 feet more or less forming a platform. They are then bolted together with large iron bolts. The space between the timbers where the bolts pass through are to be made up by putting in short pieces of plank as at m, n, o, p, q, that the bolts may be screwed up firmly & strongly.

Fig. 2 denotes the machine upside down. A, A, A, A denote the buckets or scrapers which are open in front at the letters B, B, B, for the purpose of receiving the dirt, &c., and made of any length, depth, or width, and made fast to the under side of the platform. They may be made of wood and shod, as a common scraper or shovel is, with iron, or made wholly with iron. Any number may be attached to the platform according to the length of the machine, thereby forming a drag or machine for removing dirt, &c., under water.

The letters A and B in Fig. 1 represent the buckets or scrapers aforesaid.

D, D, D in Figs. 1 and 2 are teeth or colters for harrowing or loosening up the dirt, removing small stones, sticks, &c. Any number may be put in front of the scrapers, and some may be put advantageously on the hinder part of the machine to prepare for a second draft, especially when working between two slips or wharves, it being necessary to run the machine, in many cases, in between them backward.

The machine may be worked between two suspension boats or under one or without any, it being allowed to drag over the bottom into deep water and then drawn back to discharge its load. When working the machine between two boats or under one, the drag being always sufficiently heavy by putting weights on the machine if necessary, it is suspended by the chains and let down just low enough to take its load. It is then drawn over the shoal. When over and the depth of water is sufficient it is suspended by the chains and swings clear of the bottom, carrying the load so long as the machine is moved forward. When it is towed backward, it discharges its load at once.

We do not claim as our invention and improvement said scrapers separately and without their connection in said machine or application to the purposes aforesaid, nor any other part of said machine separately. But We do claim as our invention and improvement—

The application of said scrapers or buckets above substantially described for the purposes aforesaid and in combination with the platform, chains and colters or pins as above substantially described and with the other parts of said machine, used for the purpose of applying the same in manner aforesaid or in any other manner substantially the same.

W. P. BRAYTON.
JAMES HAMILTON.

Witnesses:
A. I. HAMILTON,
J. M. HAMILTON.